United States Patent [19]

Lim

[11] Patent Number: 5,373,206

[45] Date of Patent: Dec. 13, 1994

[54] POSITION DETECTION OF ROTORS FOR SWITCHED RELUCTANCE MOTOR

[75] Inventor: Jun Y. Lim, Seoul, Rep. of Korea

[73] Assignee: Goldstar Co., Ltd., Seoul, Rep. of Korea

[21] Appl. No.: 19,146

[22] Filed: Feb. 17, 1993

[30] Foreign Application Priority Data

Feb. 21, 1992 [KR] Rep. of Korea .................. 2680/1992

[51] Int. Cl.$^5$ ..................... H02K 11/00; H02P 1/18; H02P 3/08; H02P 5/06
[52] U.S. Cl. .................... 310/68 B; 318/138; 318/254
[58] Field of Search ............ 310/168, 68 B, 106; 318/254, 138

[56] References Cited

U.S. PATENT DOCUMENTS

| 4,748,387 | 5/1988 | Tanuma et al. ............ 318/254 |
| 4,777,419 | 10/1988 | Obradovic ............ 318/254 X |
| 4,983,894 | 1/1991 | Oku et al. ............ 318/138 |

FOREIGN PATENT DOCUMENTS

0267283A1 5/1988 European Pat. Off. .
2004141A 3/1979 United Kingdom .

Primary Examiner—Steven L. Stephan
Assistant Examiner—E. To
Attorney, Agent, or Firm—Fliesler, Dubb, Meyer & Lovejoy

[57] ABSTRACT

A position detection apparatus for a switched reluctance motor wherein a single sensor is used for detecting a rotor position and thus driving the motor. A sensing unit is provided with a single sensor for detecting a position of a rotor, a start signal generation circuit, for generating a start signal for aligning the rotor with a stator upon starting, a position detection signal input circuit for passing the position detection signal following the start signal, a drive control pulse generation circuit, for receiving an output signal from the position detection signal input circuit as a clock signal, sequentially shifting driving signals for respective phases and generating drive control pulses for respective phases, and a phase excitation circuit for logically combining phase drive control pulses from the drive control pulse generator with the start signal from the start, signal generation circuit and exciting the phases sequentially.

8 Claims, 6 Drawing Sheets

FIG. 7C  POSITION DETECTION SIGNAL

FIG. 7D  a-PHASE

FIG. 7E  b-PHASE

FIG. 7F  c-PHASE

POSITION DETECTION OF ROTORS FOR SWITCHED RELUCTANCE MOTOR

BACKGROUND OF THE INVENTION

1. Field of the Invention

The present invention relates to rotor position detection of switched reluctance motors, and more particularly to a position detection apparatus for a switched reluctance motor wherein a single sensor is used for detecting a rotor position and thus driving the motor.

2. Description of the Prior Art

Figure 1:
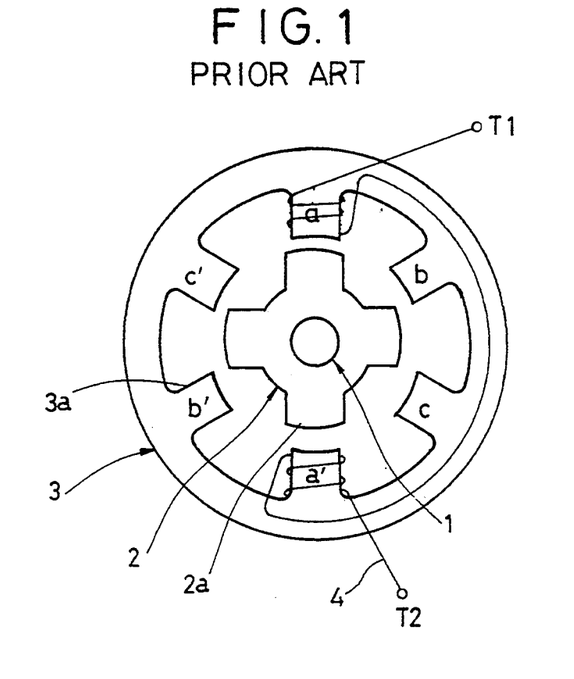
FIG. 1 is a schematic plan view of a general switched reluctance motor including six stators and four rotors.
Figure 2:
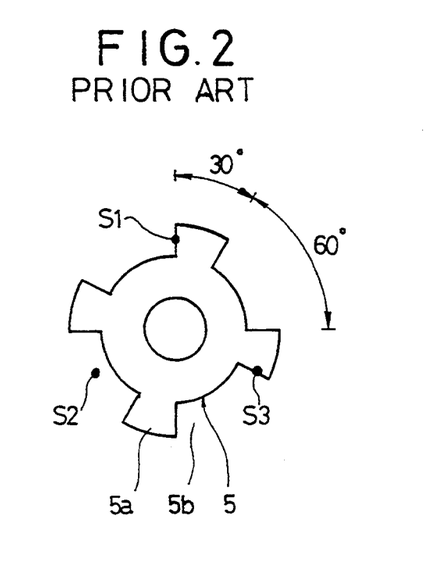
FIG. 2 is a schematic plan view of a general sensing disc including three sensors.

FIG. 1 is a schematic plan view of a general switched reluctance motor including six stators and four rotors. FIG. 2 is a schematic plan view of a general sensing disc including three sensors. As shown in the figures, the motor comprises a stator including six fixed magnetic poles 3a uniformly spaced from one another at an angle of 60° and fixedly mounted to a motor housing. Coils 4 are wound around one of pairs a–a', b–b' and c–c' of opposed fixed magnetic poles 3a to form magnetic poles with reversed polarity. With this arrangement, the pairs of opposed magnetic poles 3a have different phases a, b and c, respectively. The reluctance motor also comprises a rotor 2 disposed inwardly of the stator 3 to be rotatable about a rotating shaft 1 and provided with four rotating magnetic poles 4a spaced uniformly from one another at an angle of 90°.

In such a conventional switched reluctance motor, there is also provided a sensing disc 5 for detecting a position of the rotor 2. As shown in FIG. 2, the sensing disc 5 has four protrusions 5a each having a width corresponding to 30° and four openings 5b each defined between adjacent protrusions 5a and having a width corresponding to 60°. The sensing disc 5 is fixedly mounted to the rotating shaft 1, so as to be rotatable about the rotating shaft 1, together with the rotor 2. For detecting a rotated position of the sensing disc 5, three sensors S1, S2 and S3 are arranged on a circle and uniformly spaced from one another at an angle of 120°. Based on position detection signals from the sensors S1, S2 and S3, electric power is sequentially supplied to respective coils 4 of phases a, b and c wound around the fixed magnetic poles 3a, so as to drive the motor.

Rotor position detection and associated operations of the conventional switched reluctance motor with the above-mentioned construction will be now described, in conjunction with FIG. 3.

Figure 3A:
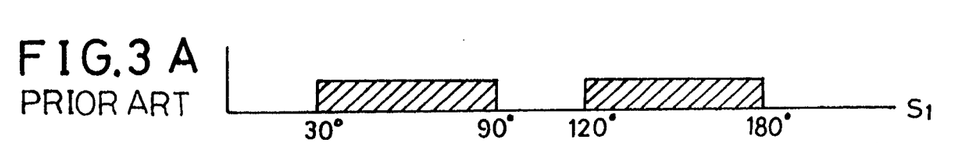
FIGS. 3A to 3F are waveform diagrams of various position detection signals and various phase excitation signals in accordance with the prior art, respectively.
Figure 3B:
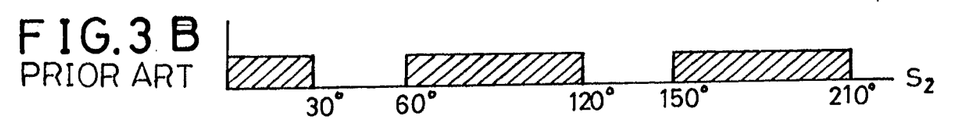
Figure 3C:
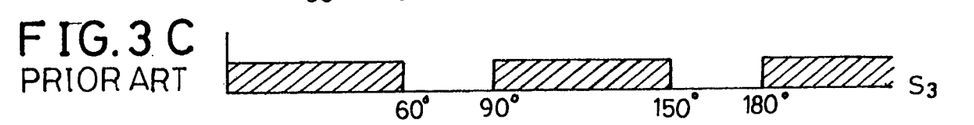

As the motor rotates counter-clockwise, the rotor 2 and sensing disc 5 rotate in the same direction. At this time, the sensors S1, S2 and S3 detect the rotated position of the sensing disc 5, As shown in FIG. 3A, the first, sensor S1 is maintained at its OFF state and thus outputs a low level signal, for 30° corresponding to the angle through which each protrusion 5a passes. Thereafter, the first sensor S1 is maintained at its ON state and thus outputs a high level signal, for 60° corresponding to the angle through which each opening 5b passes. These operations of the first sensor S1 are repeated. Similarly, the second sensor S2 and the third sensor S3 repeat their operations of being maintained at their OFF states for 30° and then maintained at their ON states for 60°. Such operations of the sensors S1, S2 and S3 are carried out at intervals of 30°.

Figure 3D:
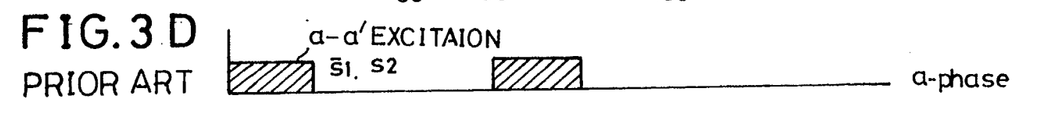
Figure 3E:
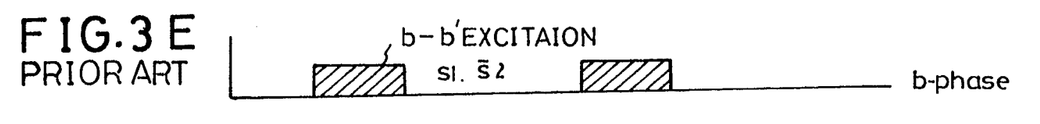
Figure 3F:
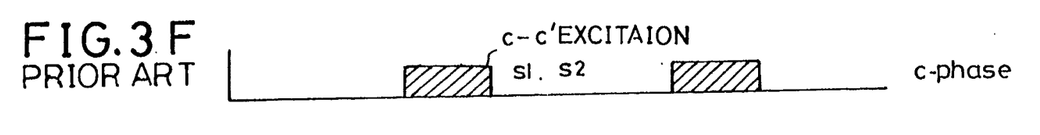

As the sensors S1 and S2 detect the rotated positions of rotor 2, they generate detection signals indicative of the rotated position of rotor 2. These detection signals are logically combined so as to drive sequentially the phases a, b and c. As shown in FIGS. 3D, 3E and 3F, the two detection signals are combined to obtain signals /S1.S2, S1./S2 and S1.S2, by which the phases a, b and c are driven.

FIGS. 3D, 3E and 3F are waveform diagrams of driving signals for the phases a, b and c when the motor rotates in counter-clockwise, respectively. These driving signals are obtained by the combination of two detection signals S1 and S3. When the motor rotates clockwise, detection signals from the sensors S1 and S3 are combined to obtain driving signals for driving respective phases a, b and c. Accordingly, at least two sensors are needed for rotating the motor in one direction. Where the motor is desired to rotate in both directions, a phase advance angle should be considered. With only two sensors, the advance angle may not be accurately detected. Therefore, it is required to use at least three sensors, for driving the motor in both directions.

Such a requirement of using a plurality of sensors (generally, three in a 6–4 pole type) for position detection in the above-mentioned position detection apparatus causes complicated mounting and wiring. Such a complication in mounting and wiring results in a degradation in productivity and an increase in cost. The mounting of many sensors causes an error in relative position among sensors. As a result, there is a drawback that position detection signals may have incorrect waveforms.

SUMMARY OF THE INVENTION

Therefore, an object of the invention is to eliminate the above-mentioned disadvantages encountered in the prior art and to provide a position detection apparatus for a switched reluctance motor, capable of accurately detecting a rotor position only by using a single sensor to drive the motor.

In accordance with the present invention, this object can be accomplished by providing a position detection apparatus for a switched reluctance motor comprising: sensing means provided with a single sensor for detecting a position of a rotor and adapted to output a clock pulse of one period upon every phase excitation as a position detection signal; start signal generation means for exciting an optional phase of the motor for a predetermined time upon starting and generating a start signal for aligning the rotor with a stator; position detection signal input means for logically combining the start signal from the start signal generation means with the position detection signal from the sensing means and passing the position detection signal following the start signal; drive control pulse generation means for receiving an output signal from the position detection signal input means as a clock signal, sequentially shifting driving signals for respective phases and generating drive control pulses for respective phases; and phase excitation means for logically combining phase drive control pulses from the drive control pulse generator with the start signal from the start signal generation means and exciting the phases sequentially.

The sensing means comprises a sensing disc having at its peripheral edge alternating protrusions and openings in predetermined number and a single sensor mounted at a position spaced at a predetermined phase advance angle from a center line on which the rotor is aligned with the stator, the sensor being adapted to generate a clock pulse of one cycle every time when one phase is excited.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 4:
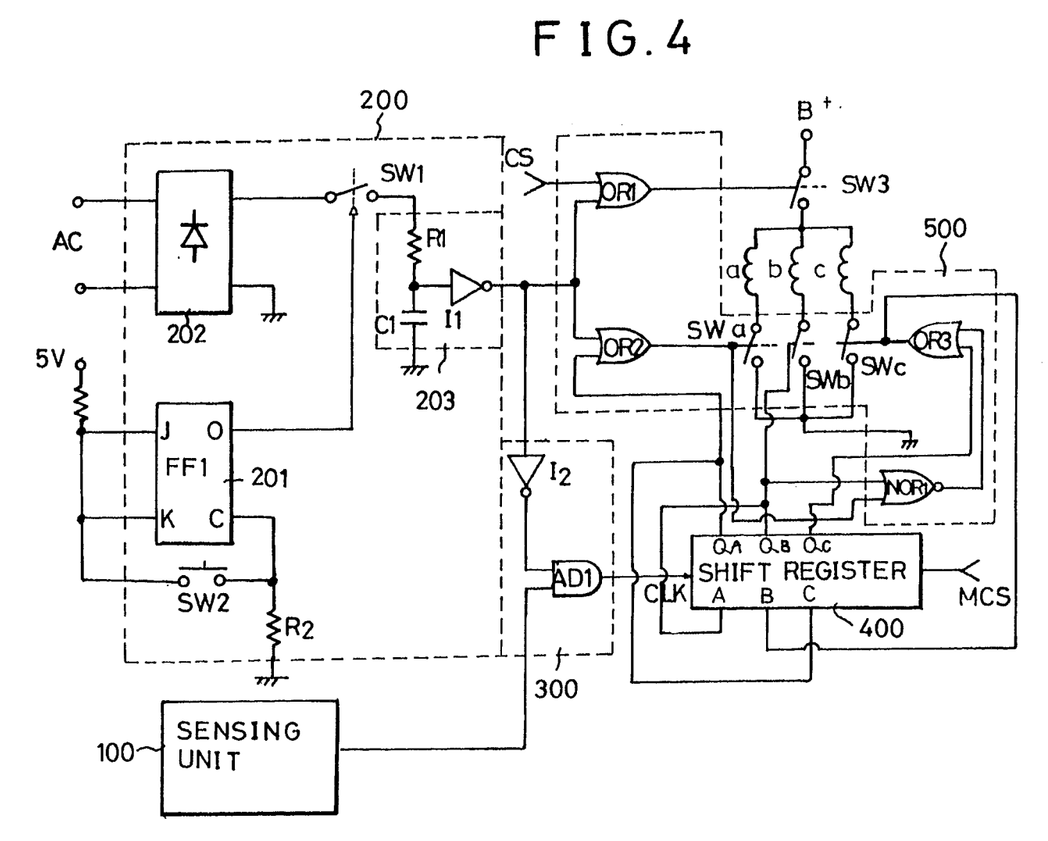
FIG. 4 is a circuit diagram of a position detection apparatus of a switched reluctance motor in accordance with the present invention.

Referring to FIGS. 4, there is illustrated a position detection apparatus for a switched reluctance motor in accordance with the present invention.

As shown in FIG. 4, the position detection apparatus comprises a sensing unit 100 provided with a single sensor for detecting a position of a rotor and adapted to output a clock pulse of one period upon every phase excitation as a position detection signal and a start signal generation circuit 200 for exciting an optional phase of the motor for a predetermined time upon starting, that is, when a start switch SW2 is pushed by the user, and for generating a start signal for aligning the rotor with a stator. A position detection signal input circuit 300 is also provided for logically combining the start signal from the start signal generation circuit 200 with the position detection signal from the sensing unit 100 and passing the position detection signal following the start signal. The position detection apparatus also comprises a drive control pulse generation circuit 400 for receiving an output signal from the position detection signal input circuit 300 as a clock signal, sequentially shifting driving signals for respective phases and generating drive control pulses for respective phases and a phase excitation circuit 500 for logically combining phase drive control pulses from the drive control pulse generator 400 with the start signal from the start signal generation circuit 200 and exciting the phases sequentially.

In accordance with the present invention, the start signal generation circuit 200 includes a flip-flop 201 for outputting a control signal for a period that the start switch SW2 control led by the user is at its ON state, a rectifier 202 for rectifying AC voltage from an AC power source into DC voltage, a switch SW1 for passing the DC voltage from the rectifier 202 therethrough, according to the control signal from the flip-flop 201, and a time constant circuit 203 for integrating the DC voltage by a resistor R1 and a condenser C1 and outputting one pulse signal maintained for a predetermined time constant via an inverter gate I1.

Additionally, the position detection signal input circuit 300 includes an inverter gate I2 for inverting the start signal from the start signal generation circuit 200 and an AND gate AD1 for AND-combining an output signal from the inverter gate I2 with the position detection signal from the sensing unit 100 and sending the resultant signal to the drive control pulse generation circuit 400.

The phase excitation circuit 500 includes a first OR gate OR1 for ORing the start signal from the start signal generation circuit 200 and a previous chopper control signal CS and controlling a main switch SW3 of the motor, a second OR gate OR2 for ORing the start signal and an a-phase drive control pulse from the drive control pulse generation circuit 400, an a-phase excitation switch $SW_a$ for controlling the a-phase of the motor based on an output signal from the OR gate OR2, a b-phase excitation switch $SW_b$ for controlling the b-phase of the motor based on a b-phase drive control pulse from the drive control pulse generation circuit 400, a NOR gate NOR1 for NORing an output signal from the second OR gate OR2 and the b-phase drive control pulse from the drive control pulse generation circuit 400, a third OR gate OR3 for ORing an output signal from the NOR gate NOR1 and a c-phase drive control pulse from the drive control pulse generation circuit 400, and a c-phase excitation switch $SW_c$ for controlling the c-phase of the motor based on an output signal from the third OR gate OR3.

Figure 5:
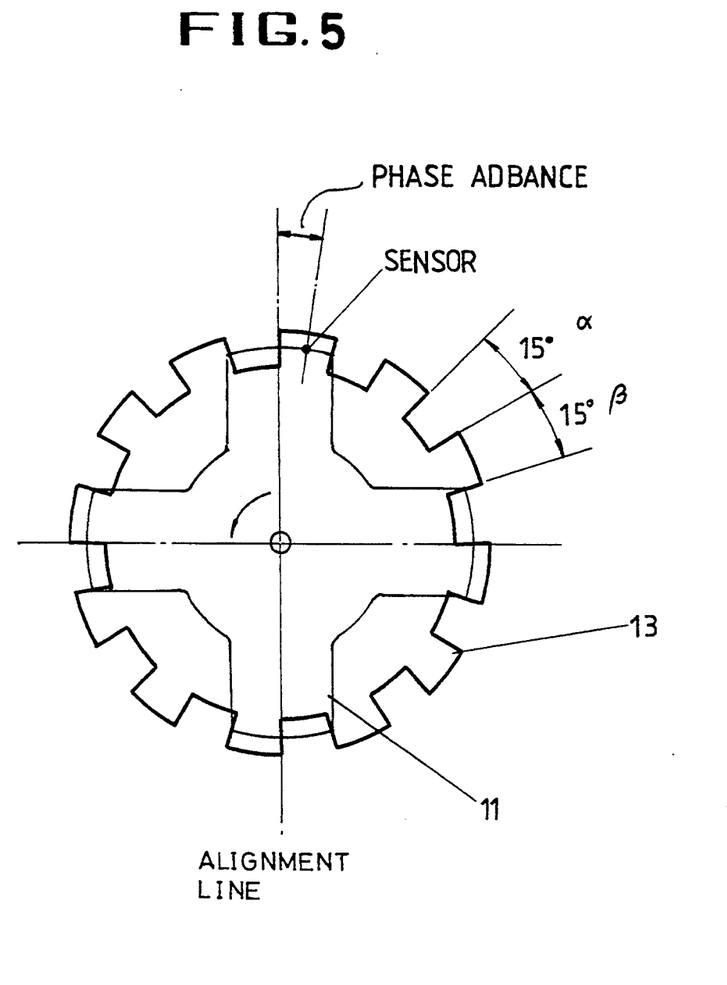
FIG. 5 is a schematic plan view of a sensing disc in accordance with the present invention, illustrating a mounted position of a sensor.

As shown in FIG. 5, the sensing unit 100 comprises a sensing disc 13 coupled to a shaft so as to be rotated together with the rotor 11. The sensing disc 13 has at its peripheral edge alternating protrusions and openings in a predetermined number. The sensing disc 13 also has a single sensor S mounted at a position spaced at a predetermined phase advance angel from a phantom line that is a center line on which the rotor 11 is aligned with the stator 12. The sensor S is adapted to generate a clock pulse of one cycle every time when one phase is excited.

In FIG. 5 illustrating the 6–4 pole type, the phase advance angle is about 7.5°. Accordingly, the sensor S is mounted to the motor housing at a position spaced at an angle of about 7.5 from the alignment line on which the rotor 11 is aligned with the stator 12. On the sensing disc 13, 12 protrusions with a width of 15° and 12 openings with a width of 15° are alternatingly formed, as shown in FIG. 5. In order to prevent the sensor S from generating an edge signal upon an excitation based on the start signal, the sensor S is mounted at a central position of a selected protrusion. The shape of the sensing disc 13 is determined by taking into consideration the fact that there is no logical error within an angle range of ±7.5° from a geometrical shape for accurately aligning the rotor 11 with the stator 12. The angle range is obtained by taking into consideration the phase advance angle. In a case of 12 protrusions and 12 openings, one period thereof is 30°. In order to avoid an erroneous alignment operation, the protrusion width a and the opening width β may be adjusted within an angle range of $\alpha+\beta=30°$. In addition, the angle range $\alpha+\beta$ may be 60° or 15°, although it is 30° in the illustrated case. In this case, the hardware is partially modified.

Operation of the switched reluctance motor with the above-mentioned construction according to the present invention will be now described.

When the user pushes the start switch SW2, a start pulse is generated from the start signal generation circuit 100. By the start pulse, an optional phase of the motor is excited, thereby causing the motor to be started. Subsequently, the sensor S detects a position of the motor and outputs a position detection pulse signal of one period upon every phase excitation. The position detection pulse signals generated from the sensor S are sent as clock signals to the drive control pulse generation circuit 400 via the position detection pulse signal input circuit 300. Based on the clock signals, the drive control pulse generation circuit 400 shifts sequentially drive signals of respective phases and generates phase-drive control pulses. Based on these phase-drive control pulses, the phase excitation circuit 500 excites phases sequentially, so as to drive the motor.

Figure 6A:
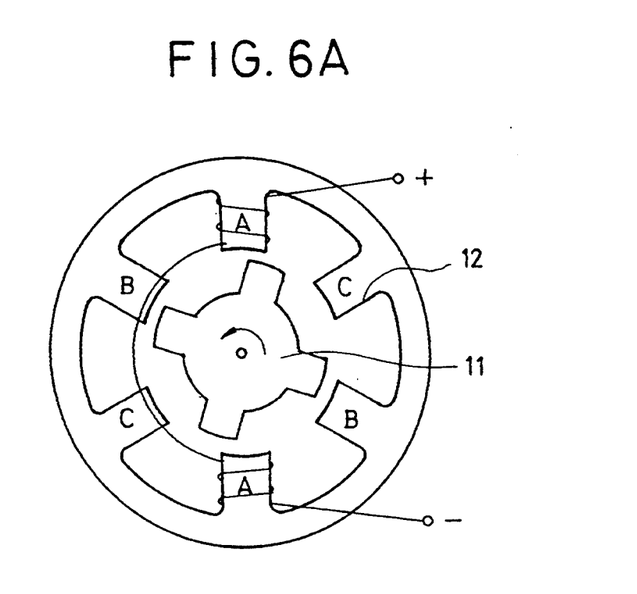
FIG. 6A is a schematic plan view explaining an initialization based on a start signal at a stopped state of the motor in accordance with the present invention.

When the user pushes the start switch SW2 under a condition that the electric power has been shut off and the motor has been stopped at a position shown in FIG. 6A, a start signal is outputted from the start signal generation circuit 200, so that the a-phase of motor is excited.

Figure 7A:
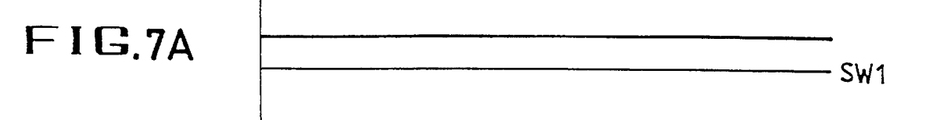
FIGS. 7A to 7F are waveform diagrams of various signals outputted from circuits shown in FIG. 4, respectively.
Figure 7B:
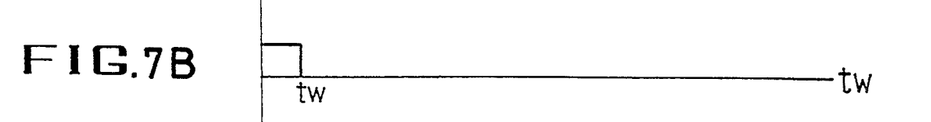
Figure 7C:
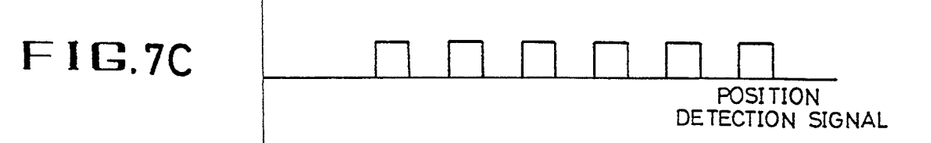

That is, as the start switch SW2 is pushed by the user, the flip-flop 201 of the start signal generation circuit 299 outputs a control signal which, in turn, makes the switch SW1 be switched to its ON state. Accordingly, a high level signal with a certain voltage (FIG. 7A) outputted from the rectifier 202 is applied to the time constant circuit 203 until the start switch SW2 is switched to its OFF state. From the point of time that the switch SW1 has been switched to its ON state, the time constant circuit 203 outputs a start signal via the inverter gate I1 for a time constant tw predetermined by the resistor R1 and the condenser C1. By the start signal, the a-phase excitation switch $SW_a$ of the phase excitation circuit 500 is switched to its ON state, thereby causing the a-phase to be excited.

Figure 6B:
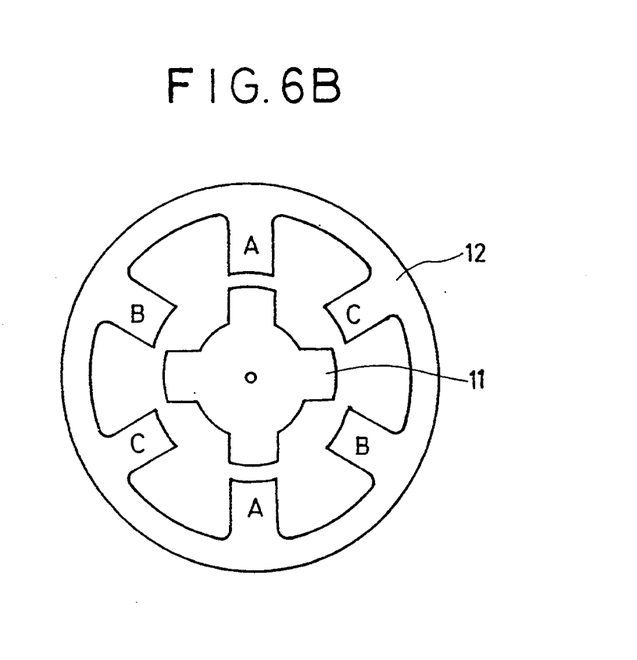
FIG. 6B is a schematic plan view explaining an alignment of a rotor with a stator based on the initialization in accordance with the present invention.

As the a-phase is excited by the start signal, the rotor 11 is rotated. At this time, the fixed magnetic poles of the a-phase attract the rotor, so that the rotor is stopped at a state where it is aligned with the stator, as shown in FIG. 6B. Such an initial drive time for the a-phase corresponds to the time constant tw determined by the resistor R1 and the condenser C1. The determination of the time constant is carried out by taking into consideration the time taken until the rotor is aligned with the stator and stably stopped at the aligned state, as shown in FIG. 6B.

Additionally, the position detection signal input circuit 300 shuts off unnecessary clock signals generated from the sensor S during when the start signal is outputted. That is, the inverter gate I2 outputs a low level signal during when the start signal has a high level, so that the AND gate AD1 outputs a low level signal, irrespective of the position detection signal from the sensor S. Accordingly, the position detection signal is shut off during when the start signal is a high level signal.

After the time constant has elapsed under a condition that the rotor has been aligned with the stator, the start signal generation circuit 200 outputs a low level start signal. Thus, the s\ excitation of the a-phase is completed. At this time, the NOR gate NOR1 outputs a high level signal, since both the excitation signals for the phases a and b are low level signals. By this high level signal from the NOR gate NOR1, the c-phase excitation switch $SW_c$ is switched to its ON state, thereby causing the c-phase to be excited.

As the c-phase is excited, the rotor and the sensing disc 13 coupled to the rotor are rotated. By the rotation of the sensing disc 13, the sensor S is repeatedly turned on and off and outputs position detection signals shown in FIG. 7D.

In accordance with the illustrated embodiment, a shift register is used as the drive control pulse generation circuit 400. The shift register controls the rotation direction of the motor, as its shift left or shift right is determined, based on a mode control signal MGS. Every time when the position detection signal is applied as the clock signal, the shift register shifts the current phase excitation signal.

Figure 7D:
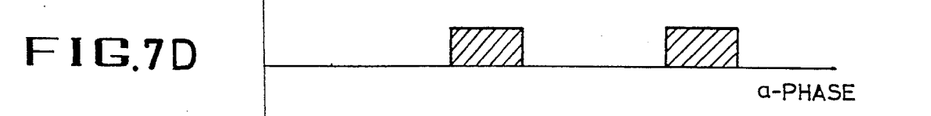
Figure 7E:
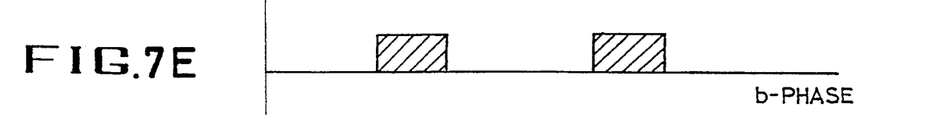
Figure 7F:
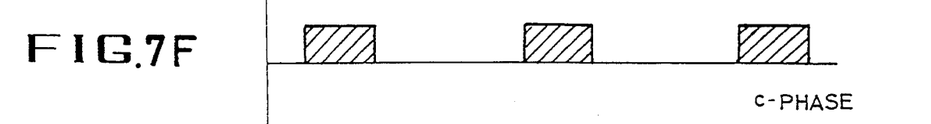

For example, when the c-phase is excited at the shift left for rotating the motor in counter-clockwise, an output signal from the third OR gate OR3, namely, a c-phase excitation signal is fed back as a b-phase feedback signal B of the shift register. Accordingly, a b-phase excitation signal $Q_B$ is outputted from the shift register, at a leading edge of a position detection signal from the sensing unit 100, thereby causing the b-phase to be excited. At this time, the b-phase excitation signal $Q_B$ is fed back as an a-phase feedback signal A, so that an a-phase excitation signal $Q_A$ is outputted from the shift register, at a leading edge of a next position detection signal from the sensing unit 100, thereby causing the a-phase to be excited. The a-phase excitation signal $Q_A$ is fed back as a c-phase feedback signal C. Where the motor rotates in counter-clockwise, the shift left of the shift register is carried out to output excitation signals for the phases a, b and c, as shown in FIG. 7D, 7E and 7F, respectively. Thus, the phase excitation is carried out in the order of c→b→a.

Therefore, as the user pushes the start switch SW2, the a-phase is initially excited for the predetermined time constant so that the initial condition for aligning the rotor with the stator is satisfied. When the start signal has a low level after the time constant has elapsed, the phase excitation circuit 500 outputs the c-phase excitation signal and thus excites the c-phase. By the excitation of the c-phase, the rotor is rotated again. As the sensing unit 100 detects the position of rotor, a clock signal of one period is outputted as a position detection signal every time when one phase is driven. Based on the position detection signal, the drive control pulse generation circuit 400 then shifts the current phase excitation signal to a next phase excitation signal, so as to excite all phases sequentially. Thus, the position of rotor can be detected by the single sensor, to drive the motor.

As apparent from the above description, the present invention provides a position detection apparatus for a switched reluctance motor capable of detecting a position of a rotor by a single sensor irrespective of the number of magnetic poles, by properly designing a sensing disc and using a shift register and a simple logic circuit. Accordingly, it is possible to simplify the sensor mounting and the wiring, eliminate an inaccuracy caused by relative errors among sensors and thus design economical and accurate motors.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A position detection apparatus for a switched reluctance motor comprising:

sensing means provided with a single sensor for detecting a position of a rotor and adapted to output a clock pulse of one period upon every phase excitation as a position detection signal;

start signal generation means for exciting an optional phase of the motor for a predetermined time upon starting and generating a start signal for aligning the rotor with a stator;

position detection signal input means for logically combining the start signal from the start signal generation means with the position detection signal from the sensing means and passing the position detection signal following the start signal;

drive control pulse generation means for receiving an output signal from the position detection signal input means as a clock signal, sequentially shifting driving signals for respective phases and generating drive control pulses for respective phases; and phase excitation means for logically combining phase drive control pulses from the drive control pulse generation means with the start signal from the start signal generation means and exciting the phases sequentially.

2. A position detection apparatus in accordance with claim 1, wherein the sensing means comprises:

a sensing disc having at its peripheral edge alternating protrusions and openings in a predetermined number and mounted to a rotating shaft to which the rotor is mounted, the sensing disc being rotated together with the rotor; and a single sensor mounted at a position spaced at a predetermined phase advance angle from a center line on which the rotor is aligned with the stator, the sensor being adapted to generate a clock pulse of one cycle every time when one phase is excited.

3. A position detection apparatus in accordance with claim 2, wherein the sensing disc has alternating 12 protrusions and 12 openings, each of the protrusions and openings having a width of 15°.

4. A position detection apparatus in accordance with claim 2, wherein the sensing disc is mounted to the rotating shaft such that the sensor is positioned at a central position of a selected one of the protrusions when the rotor is aligned with the stator.

5. A position detection apparatus in accordance with claim 1, wherein the start signal generation means comprises:

a flip-flop for outputting a control signal for a period that a start switch controlled by a user is at its ON state;

a rectifier for rectifying AC voltage from an AC power source into DC voltage;

a switch for passing the DC voltage from the rectifier therethrough, according to the control signal from the flipflop; and a time constant means for integrating the DC voltage by a resistor and a condenser and outputting one pulse signal maintained for a predetermined time constant via an inverter gate.

6. A position detection apparatus in accordance with claim 1, wherein the position detection signal input means comprises:

an inverter gate for inverting the start signal from the start signal generation means; and an AND gate for AND-combining an output signal from the inverter gate with the position detection signal from the sensing means and sending the resultant signal to the drive control pulse generation means.

7. A position detection apparatus in accordance with claim 1, wherein the drive control pulse generation means comprises a shift register for selecting one of its shift left and its shift right, receiving the position detection signal as the clock signal and sequentially shifting phase excitation signals, based on the clock signal.

8. A position detection apparatus in accordance with claim 1, wherein the phase excitation means comprises a first OR gate for ORing the start signal from the start signal generation means and a previous chopper control signal for controlling a main switch of the motor;

a second OR gate for ORing the start signal and an a-phase drive control pulse from the drive control pulse generation means;

an a-phase excitation switch for controlling an a-phase of the motor based on an output signal from the OR gate;

a b-phase excitation switch for controlling a b-phase of the motor based on a b-phase drive control pulse from the drive control pulse generation means;

a NOR gate for NORing an output signal from the second OR gate and the b-phase drive control pulse from the drive control pulse generation means;

a third OR gate for ORing an output signal frown the NOR gate and a c-phase drive control pulse from the drive control pulse generation means; and a c-phase excitation switch for controlling a c-phase of the motor based on an output signal from the third OR gate.

* * * * *